United States Patent
Ge

(10) Patent No.: US 9,293,775 B2
(45) Date of Patent: Mar. 22, 2016

(54) COMPACT SAFETY TYPE FUEL CELL SYSTEM

(71) Applicant: INFINTIUM FUEL CELL SYSTEMS (SHANGHAI) CO., LTD., Shanghai (CN)

(72) Inventor: Xuxu Ge, Shanghai (CN)

(*) Notice: Subject to any disclaimer, the term of this patent is extended or adjusted under 35 U.S.C. 154(b) by 197 days.

(21) Appl. No.: 14/359,575

(22) PCT Filed: Sep. 12, 2013

(86) PCT No.: PCT/CN2013/083382
§ 371 (c)(1),
(2) Date: May 20, 2014

(87) PCT Pub. No.: WO2014/048254
PCT Pub. Date: Apr. 3, 2014

(65) Prior Publication Data
US 2014/0322620 A1    Oct. 30, 2014

(30) Foreign Application Priority Data

Sep. 28, 2012  (CN) .......................... 2012 1 0376345

(51) Int. Cl.
  *H01M 8/04* (2006.01)
  *H01M 8/24* (2006.01)
(52) U.S. Cl.
  CPC ........ *H01M 8/04201* (2013.01); *H01M 8/2475* (2013.01); *H01M 2250/20* (2013.01); *Y02E 60/50* (2013.01); *Y02T 90/32* (2013.01)

(58) Field of Classification Search
  CPC .......... H01M 8/04201; H01M 8/2475; H01M 2250/20; Y02E 60/50; Y02T 90/32
  See application file for complete search history.

(56) References Cited

U.S. PATENT DOCUMENTS

| | | | | |
|---|---|---|---|---|
| 5,733,675 A | * | 3/1998 | Dederer ................ | H01M 8/02 429/416 |
| 2010/0279189 A1 | * | 11/2010 | Wang ................ | H01M 8/04201 429/434 |
| 2011/0045373 A1 | * | 2/2011 | Gillett ................ | H01M 8/0252 429/441 |
| 2011/0070507 A1 | * | 3/2011 | He ....................... | H01M 8/0273 429/408 |
| 2012/0015257 A1 | * | 1/2012 | Arisawa ................ | B60K 1/04 429/400 |

* cited by examiner

Primary Examiner — Raymond Alejandro
(74) Attorney, Agent, or Firm — John Lindsay

(57) ABSTRACT

This invention provides a compact safety type fuel cell system, including an enclosure and the electronic control system, electric isolation board, gas isolation board, fuel cell stack system, hydrogen delivery device installed in the enclosure. The electric isolation board divides the inside of the enclosure into electronic control system space and fuel cell stack working space, the gas isolation board divides the fuel cell stack working space into hydrogen side space and air inlet space, the air inlet space and the air inlet port of the fuel cell stack system are connected, the fuel cell stack system enclosure connects with the gas isolation board hermetically. This invention achieves electric isolation in a limited space and the effective isolation between air and hydrogen, which can directly replace the lead-acid cell system on battery-powered forklift being widely used now, requires no forklift redesign due to such problems as insufficient placing space, etc. and facilitates upgrading.

14 Claims, 3 Drawing Sheets

COMPACT SAFETY TYPE FUEL CELL SYSTEM

PRIORITY

The present invention claims priority to PCT patent application PCT/CN2013/083382, which has a filing date of Sep. 12, 2013. The present invention claims priority to Chinese patent application 201210376345, which has a filing date of Sep. 28, 2012.

BACKGROUND

1. Field of the Invention

This invention relates to the new energy field, specifically to a kind of compact safety type fuel cell system.

2. Description of the Related Art

When a fuel cell vehicle works, the hydrogen as a fuel has a chemical reaction with the atmospheric oxygen in the fuel cell on board the vehicle to generate electric power to start the motor and drive the vehicle; in addition to electricity, the chemical reaction of this category only generates water, therefore, fuel cell vehicles are called "real environmentally friend vehicle". Besides, the energy conversion efficiency of a fuel cell is 2-3 times higher than an internal combustion engine. Therefore, fuel cell vehicle is ideal in respect of both energy utilization and environmental protection.

In recent years, fuel cell vehicle has made a more important progress. Such world-renowned auto-makers as Daimler Chrysler, Ford, Toyota and General Motors Corporation have entered into the fuel cell vehicle manufacturing field one after another; as a result, the technology of fuel cell on board vehicle has had a remarkable advancement.

In view of many advantages of fuel cell over internal combustion engine, engineers have tried to apply fuel cells in multiple means of transportation for energy supply, however, a pity is that such application has only succeeded in such large vehicles as car, bus, etc. but in such small vehicles as forklift, etc., there has been almost no rational scheme. Here are the difficult points:

A fuel cell system on board vehicle consists of fuel cell stack system and electronic control system. When the fuel cell system requires hydrogen in operation, it is imperative to isolate hydrogen and the electronic control system to ensure safety, avoid such problems as explosion, etc.; at the same time, it is also necessary to prevent the hydrogen leaking from the hydrogen supply device and pipeline from entering into the air inlet passage resulting in fuel cell reducing in performance and even getting destroyed.

As fuel cell car, fuel cell bus have a lot of space to contain a fuel cell system, all existing fuel cell cars, fuel cell buses achieve electric isolation, hydrogen, air isolation by flexible and scattered setup. For example, International Publication No. 2003-104140 Patent publicized a kind of fuel cell vehicle. The said fuel cell vehicle had the fuel cells configured in the lower space of the front seats, incorporated part of auxiliary parts of fuel cells inside the center tunnel between the left and right front seats. Japanese Special Publication No. 2007-025612 Bulletin publicized the construction of a kind of vehicle frame. The said vehicle frame construction had a pair of central supports on the left and right set up in a way to support the central control console; had a pair of side supports on the left and right on the outer side in the vehicle width direction of the central support set up; had a fuel cell pack incorporated on the central console, had a DC-DC converter on the space in the vehicle width direction between the central support and side support. Therefore, for large vehicles, the sufficient carrying space avoids the problem of fuel cell miniaturization.

However, small fuel cell vehicles (such as forklift, tourist coach) are limited in volume with little space to carry a fuel cell system, which is unable to accomplish the electric isolation, hydrogen, air isolation in a fuel cell system on board vehicle as accomplished in fuel cell car, fuel cell bus by way of flexible and scattered setup at all. Accomplishing compact placing of a fuel cell system on board vehicle and electric isolation, hydrogen, air isolation, etc. concurrently in a limited space becomes a main factor to restrict the development of small fuel cell vehicles.

It is found through retrieving existing technical references that Patent No. 200820233706.2 utility of China publicized a kind of forklift gas bottle fixing device through which a gas bottle is fixed outside a forklift. Such setup not only has a hazard, but also influences appearance; the disadvantage is: due to internal forklift space being limited, it is unable to accommodate a whole on-board fuel cell system in a limited space (including hydrogen bottle, fuel cell stack, controller, etc.), as a result, it is unable to achieve efficient, safe operation of an on-board fuel cell system.

SUMMARY

The purpose of this invention is to overcome the disadvantage the above existing technology has by providing a kind of compact safety type fuel cell system. Therefore, the inventor has insisted on years of hard research, invested a great deal of time and energy, especially the same had to solve such a problem as isolation between hydrogen use area and the electronic control system in a narrow and compact space, the huge volume resulting from traditional isolation method with a designed system being unable to be put in such narrow and compact space and difficulty in disassembly and installation even if it can be put in. That problem almost made the research and development fall into bottleneck. Luckily, through tests over one hundred times, difficult problems were overcome one after another and fuel cell miniaturization was eventually accomplished really. The fuel cell system provided according to this invention is compact in structure and can be integrally put in the limited space of a small vehicle (such as forklift, tourist coach); at the same time, the system provided by this invention, through intensive electric isolation, hydrogen, air isolation device, achieves an effective isolation in a limited space and thus realizes the efficient, safe operation of a compact safety type fuel cell system.

According to one aspect of this invention, it provides a compact safety type fuel cell system, including enclosure and the electronic control system, electric isolation board, gas isolation board, fuel cell stack system, hydrogen delivery device installed in the said enclosure, with the said electric isolation board connecting with the said enclosure hermetically dividing the inside of the said enclosure into electronic control system space and fuel cell stack working space, the said gas isolation board connecting with the said enclosure hermetically dividing the fuel cell stack working space into hydrogen side space and air inlet space, the said electronic control system being located in the said electronic control system space, the said hydrogen delivery device, fuel cell stack system being located in the hydrogen side space, the said air inlet space connecting with the air inlet port of the said fuel cell stack system, the hydrogen supply outlet of the said hydrogen delivery device connecting the hydrogen inlet port of the said fuel cell stack system, hydrogen discharge pipe inlet port of the said hydrogen delivery device connecting the hydrogen exhaust port of the said fuel cell stack system and the said fuel cell stack system enclosure connecting with the said electric isolation board hermetically.

Preferably, the air discharge port of the said fuel cell stack system connects with the said hydrogen side space.

Preferably, the said air inlet space is located between the said electronic control system space and hydrogen side space.

Preferably, the said electronic control system, fuel cell stack system, hydrogen delivery device are arranged in proper order along the longitudinal direction of the said enclosure.

Preferably, an air filter is provided on the inner side of the air inlet hole connecting with the said air inlet space on the said enclosure.

Preferably, the said electric isolation board is parallel with the gas isolation board, the said air filter is connected between the edges of the electric isolation board and gas isolation board.

Preferably, a sealing connection is provided at the upper parts of both the said electric isolation board and gas isolation board, the said fuel cell stack system and electronic control system are connected with each other through an electric wire passing through the sealing connection.

Comparing with the existing technology, this invention has the following beneficial effects:

1. Being compact in structure, it can replace directly the lead-acid cell system on battery forklift being widely used now and it is not necessary to redesign a forklift due to such problems as insufficient placing space, etc. and facilitates upgrading;
2. The intensive air supply isolation device realizes electric isolation and effective isolation between air and hydrogen in a limited space, as a result, the efficient, safe operation of forklift fuel cell system is achieved;
3. Due to effective electric isolation realization, the electronic control system can use ordinary electronic parts and it is not necessary o use anti-explosion parts or have electronic control parts sealed one by one, as a result, the production cost is substantially reduced and the fuel cell forklift marketization progress is promoted;
4. Due to effective hydrogen and air isolation realization, it is not necessary to provide a lot of ventilating holes on the enclosure that the hydrogen side space corresponds to for removing the hydrogen leaking from the hydrogen delivery device, as a result, dust in air is kept from entering into the system to influence the service life thereof while ensuring the hydrogen use safety;
5. Due to effective hydrogen and air isolation realization, the hot air discharged by the fuel cell stack system will not enter into the air supply pipe with system temperature rise and air flow increase resulting from hot air entry being prevented; the hot air, which centralizes on one side of the fuel cell stack system and hydrogen delivery device, heats the hydrogen delivery device effectively, increases the temperature of hydrogen entering into the fuel cell stack and thus favors improvement in cell stack reaction performance; also, it can prevent hydrogen delivery pipeline from freezing at a low temperature;
6. By providing reinforcing strips on one side near the cover plate on the left and right side boards of the enclosure, the structural strength of the whole system is strengthened.

BRIEF DESCRIPTION OF THE DRAWINGS

By reading and referring to the detailed descriptions made to the non-restrictive embodiment examples by the following attached figures, other characteristics, purposes and advantages of this invention will become more evident.

DETAILED DESCRIPTION

A detailed description to this invention is to be made below by combining with specific embodiment examples and attached figures. The following embodiment examples will help the technical personnel in this field further understand this invention, but it does not limit this invention in any form. It should be pointed out that for ordinary technical people in this field, adjustments and changes can also be made. All these belong to the protection scope of this invention under the prerequisite of not being divorced from the conceiving of this invention.

In the figures, 1 is supporting board, 2 is hydrogen delivery device, 3 is fuel cell stack system, 4 is electronic control system, 5 is electric isolation board, 6 is gas isolation board, 7 is No. 1 sealing strip, 8 is sealing connection, 9 is No. 1 air filter, 10 is No. 2 air filter, 11 is No. 2 sealing strip, 12 is No. 3 sealing strip, 13 is air discharge chamber, 14 is front baffle plate, 15 is cover plate, 16 is back baffle plate, 17 is emptying hole, 18 is heat dissipation hole, 19 is reinforcing strip, 20 is hydrogen discharge hole and 21 is air inlet hole.

Specific Embodiments

A detailed description to this invention is to be made below by combining with specific embodiment examples and attached figures. The following embodiment examples will help the technical personnel in this field further understand this invention, but it does not limit this invention in any form. It should be pointed out that for ordinary technical people in this field, adjustments and changes can also be made. All these belong to the protection scope of this invention under the prerequisite of not being divorced from the conceiving of this invention.

Embodiment Example 1

Figure 1:
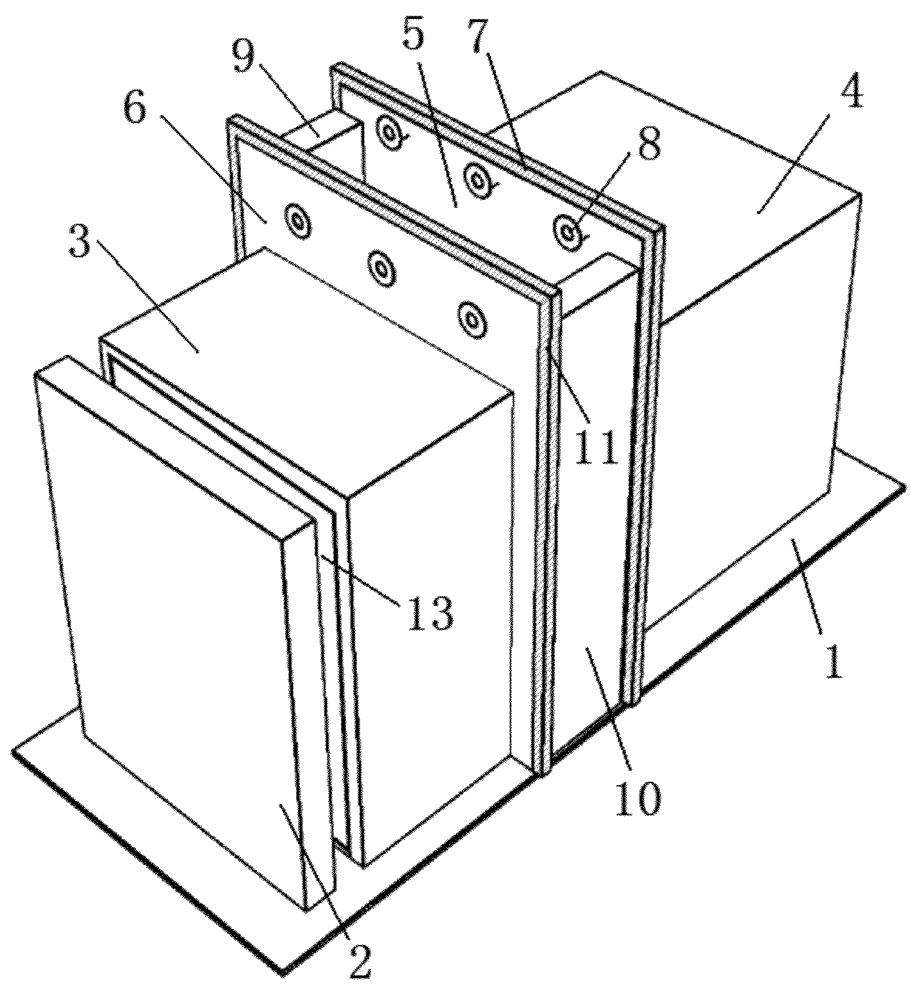
FIG. 1 is the schematic diagram of the internal structure of the compact safety type fuel cell system provided according to this invention.
Figure 3:
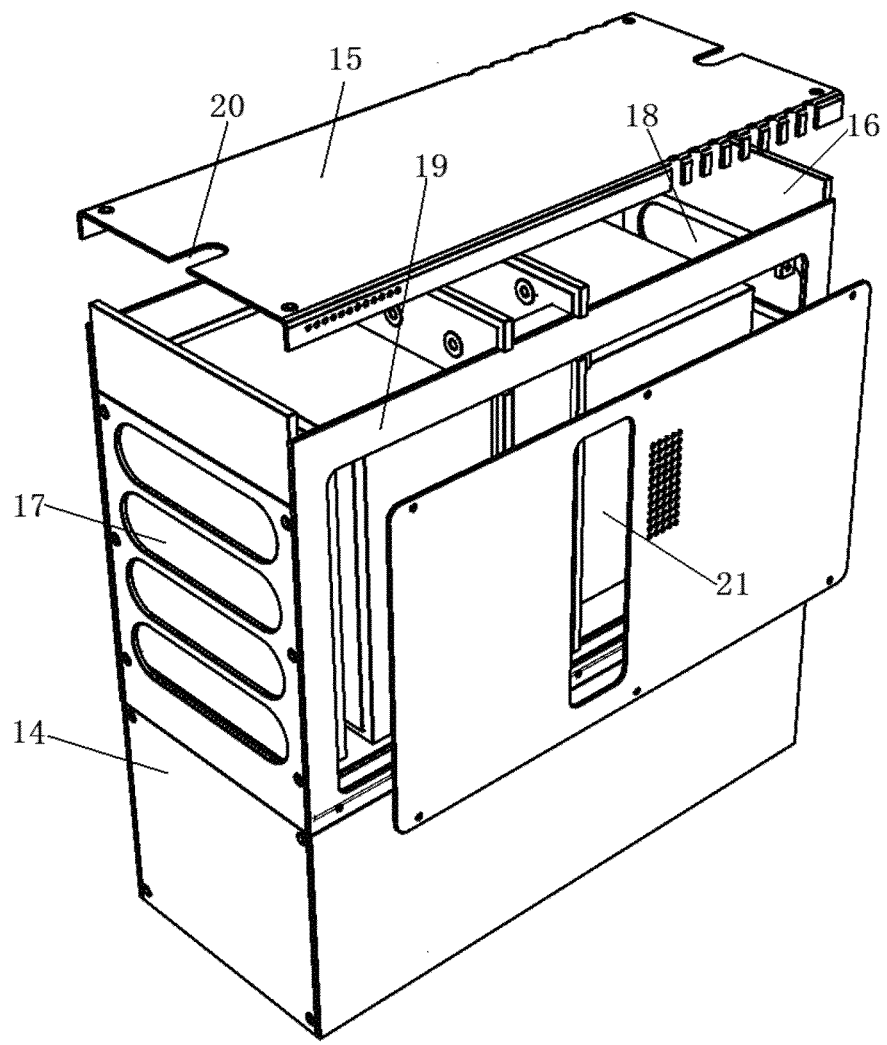
FIG. 3 is the schematic diagram of the integral structure of the compact safety type fuel cell system provided according to this invention.

In this embodiment example, the schematic diagram of the integral structure of the said forklift fuel cell system is as shown in FIG. 3, the schematic diagram of the internal structure is as shown in FIG. 1. The fuel cell stack system adopted by this embodiment example is an air-cooled fuel cell stack system; and in a varied example, the technical people in this field can also accomplish a water-cooled fuel cell stack system by combining with the existing technology and no unnecessary detail is to be given here.

We can see clearly from FIGS. 1, 3 that the forklift fuel cell system in this embodiment example includes enclosure (consisting of left and right baffle plates, front baffle plate 14, back baffle plate 16, cover plate 15, base plate), hydrogen delivery device 2, fuel cell stack system 3, electronic control system 4 (consisting of DCDC, relay, controller, energy storage device, etc.), supporting board 1 and air supply isolation device. The said supporting board 1 is hermetically fixed inside the enclosure and is parallel with the enclosure base plate. The supporting board 1 divides the inside of the enclosure into upper, lower two spaces. The lower space is used to place hydrogen bottle (which can also be a hydrogen reforming device). The supporting plate hermetically connects with the joints of the left and right side boards, front baffle plate, back baffle plate to stop gas leakage into each other from both spaces. The said hydrogen delivery device 2, the fuel cell stack system 3, the air supply isolation device and the electronic control system 4 are provided on the supporting board fixedly in proper order in a direction from front to back; the said air supply isolation device includes No. 1 isolation device, No. 2 isolation device and air supply passage, the said air supply passage connects with the air inlet port of the fuel cell stack system 3, the said No. 1 isolation device has the hydrogen delivery device 2 and the fuel cell stack system 3 hermetically isolated in the electronic control system 4, the said No. 2 isolation device has hydrogen delivery device 2 hermetically isolated in the air supply passage.

Figure 2:
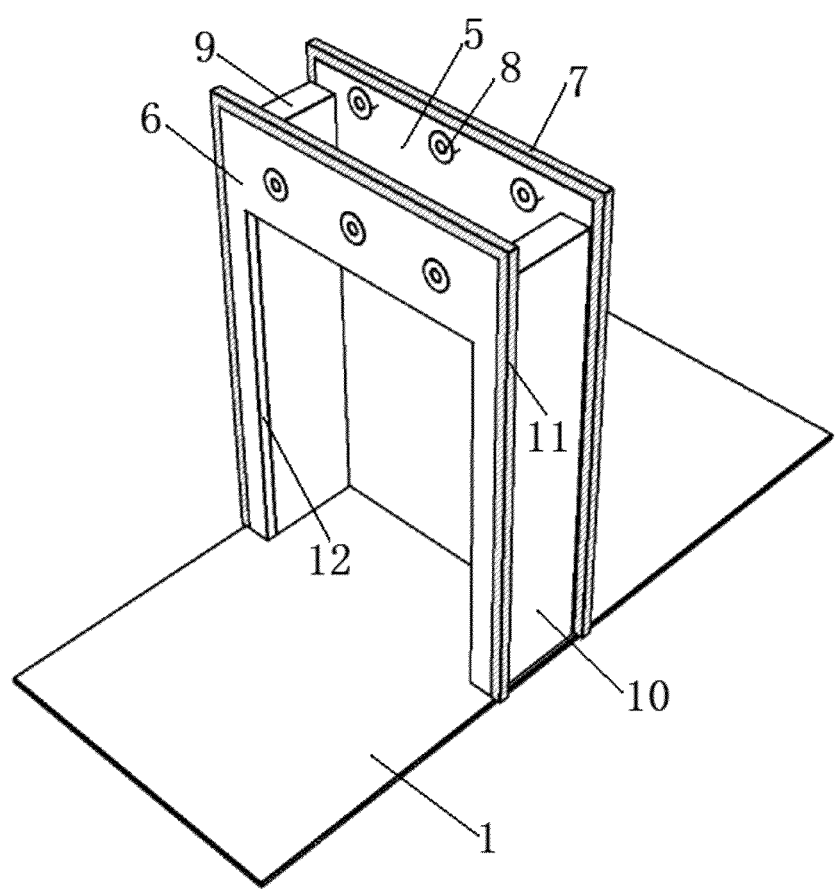
FIG. 2 is the schematic diagram of the structure of the air supply isolation device in the internal structure of the compact safety type fuel cell system as shown in FIG. 1.

The schematic diagram of the structure of the air supply isolation device in this embodiment example is as shown in FIG. 2. The said No. 1 isolation device is electric isolation board 5, the said No. 2 isolation device is gas isolation board 6 with a square groove on the bottom side. The said electric isolation board 5 and gas isolation board 6 are perpendicularly fixed on the supporting board 1 and parallel setup is provided between both. The said gas isolation board 6 and supporting board 1 and the left and right side boards of the enclosure, the cover plate 15 are hermetically connected. The said electric isolation board 5 and the supporting board 1 and the left and right side boards of the enclosure, the cover plate 15 are hermetically connected; the said square groove is connected with the air inlet port of the fuel cell stack system. The said gas isolation board 6 and fuel cell stack system 3 are hermetically sealed between them. On the left and right side boards of the enclosure between the said electric isolation board 5 and gas isolation board 6, a hole connecting with outside air is provided (the air inlet hole 21 as shown in FIG. 3, can also be a multi-hole form). The said electric isolation board 5, gas isolation board 6 forms the left and right side boards of the enclosure and the square groove between both the said air supply passage; on the said electric isolation board 5 and gas isolation board 6, a number of sealing connections 8 are provided respectively. The said fuel cell stack system 3 and the electronic control system 4 are connected through the electric wire passing through the sealing connection 8. The hot air discharged by the fuel cell stack system 3 is discharged through the air discharge chamber 13 provided inside it into the space constituted by supporting board 1, the periphery of fuel cell stack system 3, the periphery of hydrogen delivery device, No. 2 isolation device and enclosure, and is discharged into the external air through the emptying hole 17 provided on the front baffle plate 14. The heat generated by the electronic control system 4 in working is discharged through the heat dissipation hole 18 provided on the back baffle plate 16.

In this embodiment example, the electric isolation board isolates the fuel cell stack working space and the electronic control system space to prevent hydrogen leaking in any circumstances from entering into the electronic control system space. Therefore, the elements in that electronic control system space can be ordinary electronic elements and it is not necessary to use anti-explosion parts or seal electronic control parts one by one, as a result, the production cost is substantially reduced and the fuel cell forklift marketization progress is promoted.

The gas isolation board in this embodiment example isolates the hydrogen side space and air inlet space, prevents hydrogen leaking in any circumstance from entering into the fuel cell stack through the air supply passage to damage the fuel cells; it is also not necessary to provide on the enclosure that the hydrogen side space corresponds to a lot of ventilating holes to remove the hydrogen leaking from the hydrogen delivery device, as a result, dust in air will not be allowed to enter into the system to influence the service life thereof while hydrogen use safety is ensured. At the same time, the hot air discharged by the fuel cell stack system will not enter into the air supply passage to prevent system temperature rise and air flow increase resulting from hot air entry; meanwhile, the hot air centralizing on one side of the fuel cell stack system and hydrogen delivery device effectively heats the hydrogen delivery device to increase the hydrogen temperature entering into the fuel cell stack and thus favor improvement in the reaction performance of the fuel cell stack; this can also prevent the hydrogen delivery pipeline from freezing at a low temperature. Also due to this, the system in this embodiment example needs no hydrogen preheating device provided additionally; and assuming the circumstance that hydrogen leaks from the inlet, outlet pipes, valves of the hydrogen delivery device, the air discharged by the fuel cell stack system also plays a role to dilute the hydrogen concentration to reduce the possibility of system explosion.

In this embodiment example, the gas isolation board 6, electric isolation board 5 and supporting board 1, the left and right side boards of the enclosure, the cover plate 15 are hermetically connected between them to safeguard the sealing isolation performance. Such hermetical connection can be achieved by the following several ways:

(1) In this embodiment example, the electric isolation board 5 and the supporting board 1 and the left and right side boards of the enclosure, the cover plate 15 are hermetically connected through the sealing strip provided on the electric isolation board 5 (No. 1 sealing strip 7) or the gaskets provided on the supporting board 1, the left and right side boards of the enclosure, the cover plate 15; the said gas isolation board 6 and the supporting board 1 and the left and right side boards of the enclosure, the cover plate 15 are hermetically connected through the sealing strip provided on the gas isolation board 6 (No. 2 sealing strip 11) or the gaskets provided on the supporting board 1, the left and right side boards of the enclosure, the cover plate 15. The said gas isolation board 6 and fuel cell stack system 3 are hermetically connected in between through the sealing strip provided on the square groove wall of the gas isolation board 6 (No. 3 sealing strip 12).

(2) In a variation of this embodiment example, the electric isolation board 5 and supporting board 1 can be hermetically sealed by welding, the hermetical connection with the left and right side boards of the enclosure, the cover plate 15 is realized through the sealing strip provided on the electric isolation board 5 or the gaskets provided on the left and right side boards of the enclosure, the cover plate 15; the said gas isolation board 6 and supporting board 1 can be hermetically connected by welding, and the hermetical connection with the left and right side boards of the enclosure, the cover plate 15 is realized by the sealing strip provided on the gas isolation board 6 or the gaskets provided on the left and right side boards of the enclosure, the cover plate 15.

(3) In the first preferable case of this embodiment example, reinforcing strip 19 parallel with ground (as shown in FIG. 3) is provided on one side near the cover plate 15 on the left and right side boards of the said enclosure, the hermetical connection between electric isolation board 5, gas isolation board 6 and reinforcing strip 19 is realized by welding respectively; the hermetical connection between electric isolation board 5 and supporting board 1 is realized by welding; the hermetical connection between electric isolation board 5, gas isolation board 6 and the left and right side boards of the enclosure, the remaining part except reinforcing strip 19, cover plate 15 is realized by using sealing strip or gasket. The purpose of providing reinforcing strip is to enhance the structural strength.

As a preferable technical scheme of this embodiment example, the number of said air filters is 2, which is No. 1 air filter 9 and No. 2 air filter 10 respectively. At the locations near the left and right side boards of the enclosure between the said electric isolation board 5, gas isolation board 6, No. 1 air filter 9 and No. 2 air filter 10 are provided; the No. 1 air filter 9, No. 2 air filter 10 are all perpendicular to the said electric isolation board 5. The air filter removes dust by filtering to make air entering into fuel cell stack system 3 clean and thus favor improvement in the service performance and life of the whole system.

As a preferable technical scheme of this embodiment example, cover plate 15 is not a traditional plane board, the cross section of which is in concave shape (as shown in FIG. 3). In service, it is snap-fitted and fixed together with the left and right side boards; the reason to adopt such cover plate 15 is because that cover plate 15 joins with the left and right side boards on the side but not on the top, so even in case of such extreme circumstance as water drenching, it is not easy for water to enter into the system from the joints of cover plate 15 with the left and right side boards and it plays a good role of waterproofing. At the location near the front board 14 on the cover plate 15, hydrogen discharge hole 20 is provided, which connects with the hydrogen discharge pipe of hydrogen delivery device 2. The hydrogen discharge pipe inlet port of hydrogen delivery device (2) connects with the hydrogen exhaust port of fuel cell stack system (3).

In this embodiment example, the dimension of the square groove on the bottom side of gas isolation board 6 is slightly greater than the peripheral dimension of fuel cell stack system 3. The fuel cell stack system 3 can stretch into the air supply passage slightly through the square groove. The hermetical connection between the square groove of gas isolation board 6 and the joint location of fuel cell stack system 3 is realized by using sealing strip. In actual service, in the circumstance that the peripheral dimension of fuel cell stacks system 3 is greater than the square groove on the bottom side of gas isolation board 6, the hermetical connection can be realized by providing a sealing strip or gasket at the contact position between fuel cell stack system 3 and gas isolation board 6.

In a variation of this embodiment example, the said square groove can be changed into an opening, the dimension of the opening is slightly greater than the peripheral dimension of fuel cell stack system 3. The fuel cell stack system 3 can stretch into the air supply passage slightly through that opening. In more varied cases, the shape of the said groove or opening can be other shapes. The technical people in this field can design the shape of the said groove or opening correspondingly according to the outline of the said cell stack system 3. No unnecessary detail is to be given here.

The specific embodiment example of this invention is described above. What needs to be understood is that this invention is not limited to the above specific embodiment. The technical people in this field can make all variations or modifications with the claim scope and this will not influence the essential content of this invention.

The invention claimed is:

1. A compact safety type fuel cell system comprising:
    enclosure and the electronic control system (4), electric isolation board (5), gas isolation board (6), fuel cell stack system (3);
    hydrogen delivery device (2) installed in the said enclosure, which is characterized by the said electric isolation board (5) connecting with the said enclosure hermetically dividing the inside of the said enclosure into electronic control system space and fuel cell stack working space;
    the said gas isolation board (6) connecting with the said enclosure hermetically dividing the said fuel cell stack working space into hydrogen side space and air inlet space;
    the said electronic control system (4) being located in the said electronic control system space;
    the said hydrogen delivery device (2), fuel cell stack system (3) being located in the said hydrogen side space;
    the said air inlet space and the air inlet port of the said fuel cell stack system (3) being connected with each other;
    the hydrogen supply outlet port of the said hydrogen delivery device (2) connecting with the hydrogen inlet port of the said fuel cell stack system (3);
    the hydrogen discharge pipe inlet port of the said hydrogen delivery device (2) connecting with the hydrogen exhaust port of the said fuel cell stack system (3), the enclosure of the said fuel cell stack system (3) connecting with the said electric isolation board (5) hermetically.

2. The system of claim 1, the said compact safety type fuel cell system is characterized by the air discharge port of the said fuel cell stack system (3) and the said hydrogen side space being connected with each other.

3. The system of claim 2, the said compact safety type fuel cell system is characterized by the said air inlet space being located between the said electronic control system space and hydrogen side space.

4. The system of claim 3, the said compact safety type fuel cell system is characterized by the said electronic control system (4), fuel cell stack system (3), hydrogen delivery device (2) being arranged in proper order along the longitudinal direction of the said enclosure.

5. The system of claim 1, the said compact safety type fuel cell system is characterized by an air filter being provided on the inner side of the air inlet hole (21) connecting with the said air inlet space on the said enclosure.

6. The system of claim 5, the said compact safety type fuel cell system is characterized by the said electric isolation board (5) being parallel with the gas isolation board (6), the said air filter being connected between the edges of the said electric isolation board (5) and gas isolation board (6).

7. The system of claim 1, the said compact safety type fuel cell system is characterized by a sealing connection (8) being provided at the upper parts of both the said electric isolation board (5) and gas isolation board (6), the said fuel cell stack system (3) and electronic control system (4) being connected through the electric wire passing through the sealing connection (8).

8. A fuel cell system comprising:
    an enclosure bounding an interior, an electronic control system, an electric isolation board, a gas isolation board, and a fuel cell stack system;
    a hydrogen delivery device disposed in said enclosure;
    said electric isolation board sealably joined within said enclosure, dividing said interior of said enclosure, and defining an electronic control system space and a fuel cell stack working space;
    said gas isolation board sealably joined with said enclosure, dividing said fuel cell stack working space, and defining a hydrogen side space and an air inlet space;

said electronic control system disposed in said electronic control system space;

said hydrogen delivery device, fuel cell stack system disposed in said hydrogen side space;

the enclosure of said fuel cell stack system in fluid communication with said electric isolation board;

said air inlet space and an air inlet port of said fuel cell stack system in fluid communication;

a hydrogen supply outlet port of said hydrogen delivery device in fluid communication with a hydrogen inlet port of said fuel cell stack system;

a hydrogen discharge pipe inlet port of said hydrogen delivery device in fluid communication with a hydrogen exhaust port of said fuel cell stack system.

9. The system of claim 8, further comprising an air discharge port of said fuel cell stack system in fluid communication with said hydrogen side space.

10. The system of claim 9, wherein said air inlet space is disposed between said electronic control system space and said hydrogen side space.

11. The system of claim 10, wherein said electronic control system, said fuel cell stack system, and said hydrogen delivery device are adjacent each other along a longitudinal axis presented by said enclosure.

12. The system of claim 8, further comprising an air filter joined to the inner side of an air inlet hole in fluid communication with said air inlet space of said enclosure.

13. The system of claim 12, wherein said electric isolation board is oriented parallel with said gas isolation board, said air filter being joined between the edges of said electric isolation board and said gas isolation board.

14. The system of claim 8, further providing a sealing connection joined at the upper parts of both said electric isolation board and said gas isolation board, said fuel cell stack system and said electronic control system in communication through a wire passing through said sealing connection.

* * * * *